No. 625,604. Patented May 23, 1899.
J. RESCH.
CYCLE DRIVING MECHANISM.
(Application filed Jan. 25, 1898.)
(No Model.) 2 Sheets—Sheet 1.
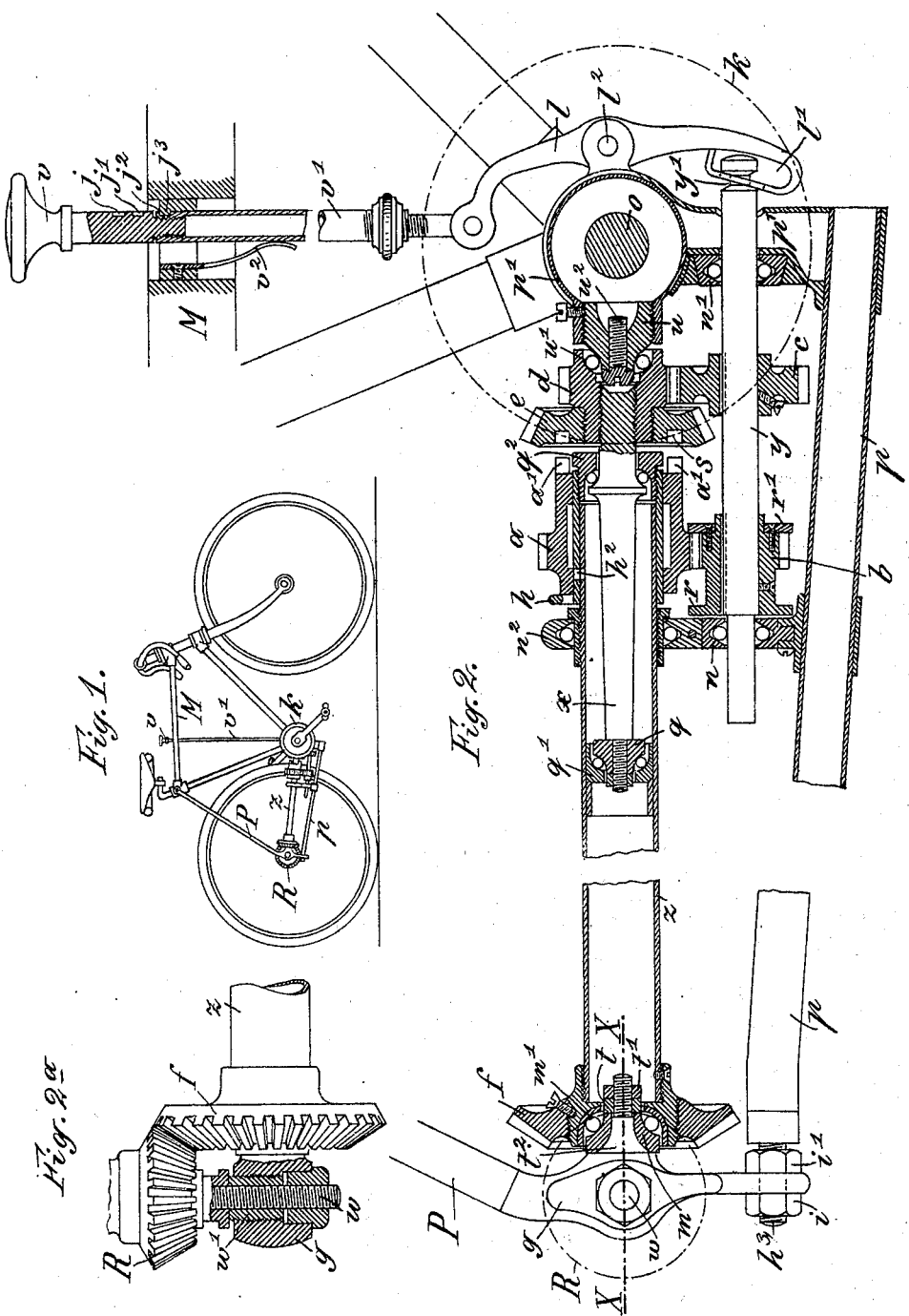
Witnesses:
William Miller.
William Schulz.
Inventor:
Johann Resch
by his attorneys
Roeder & Briesen

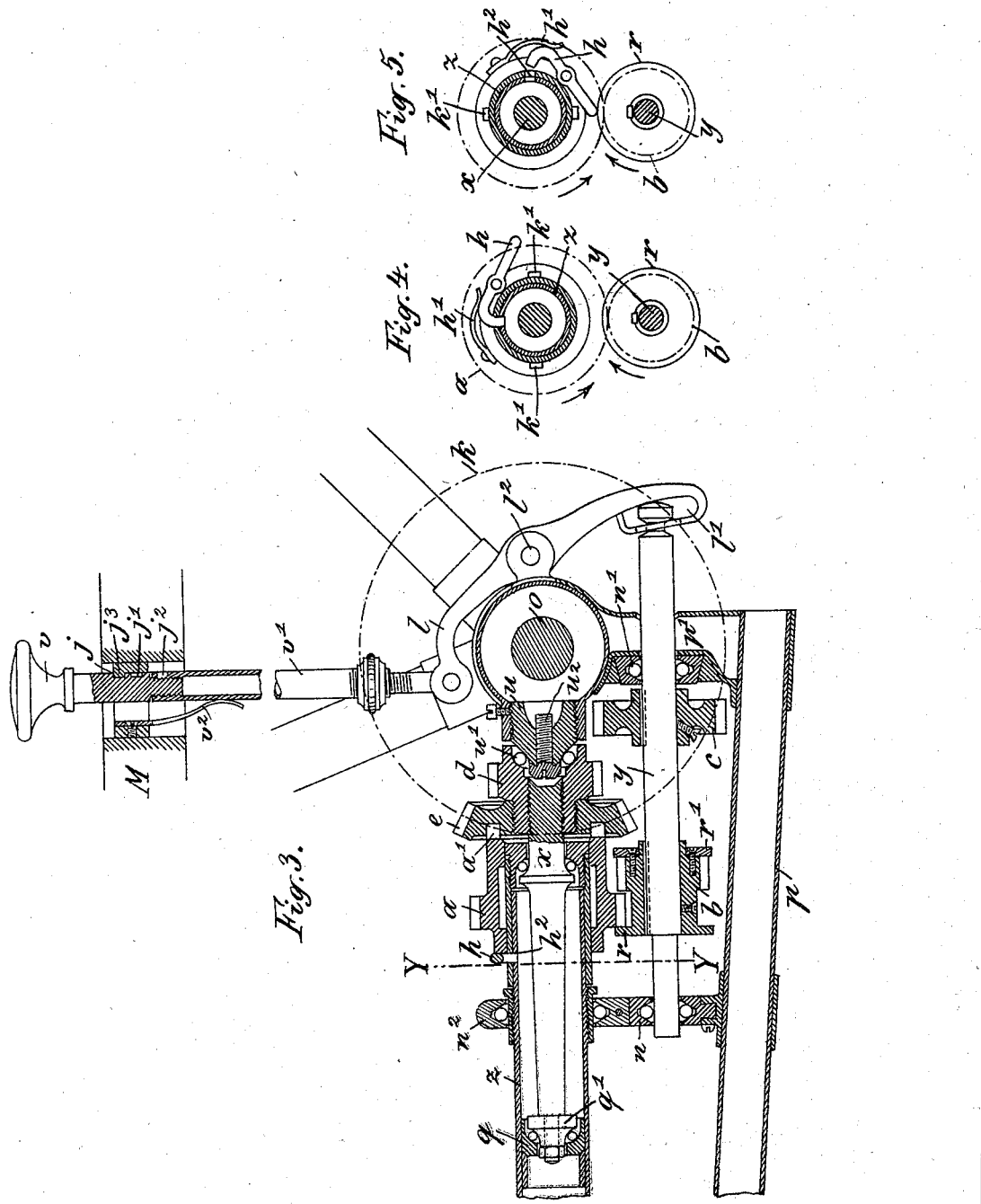

UNITED STATES PATENT OFFICE.

JOHANN RESCH, OF GRAZ, AUSTRIA-HUNGARY.

CYCLE DRIVING MECHANISM.

SPECIFICATION forming part of Letters Patent No. 625,604, dated May 23, 1899.

Application filed January 25, 1898. Serial No. 667,862. (No model.)

*To all whom it may concern:*

Be it known that I, JOHANN RESCH, a subject of the Emperor of Austria-Hungary, and a resident of Graz, Austria-Hungary, have invented certain new and useful Improvements in Cycle Driving Mechanism, of which the following is a full and clear specification.

This invention relates to a bicycle adapted to be geared for slow and quick motion by means of a hollow transmission-shaft and an inner shaft which is adapted to rotate at times freely within the hollow shaft and at others to be locked thereto, all as hereinafter more fully pointed out.

In the accompanying drawings, Figure 1 is a side view of the bicycle; Fig. 2, a sectional elevation of the driving mechanism, the slow-motion gearing being used; Fig. $2^a$, a cross-section on the line X X of Fig. 2; Fig. 3, a sectional elevation of the driving mechanism, the quick-motion gearing being used. Fig. 4 is a cross-section on the line Y Y of Fig. 3, the spring-latch being locked; Fig. 5, the same section, the spring-latch being opened.

Similar letters of reference indicate corresponding parts.

On the crank-axle $o$ is fixed a bevel-gear $k$, meshing with a bevel-gear $e$, connected rigidly with the gear $d$ on shaft $x$. Shaft $x$ is supported in ball-bearings $q$ $q'$ $q^2$ in the hollow axle $z$.

On the rear-wheel hub is fixed a bevel-gear R, meshing with a bevel-gear $f$, keyed on the hollow axle $z$ and supported in bearings $m$ $m'$, the cone $m$ thereof being screwed to the cone-holder $g$ by means of a nut $t$. The cone-holder is made in one with or fastened rigidly to the rear fork P, thus serving as support for the cone $m$ and for the rear-wheel axle $w$.

Sliding on but turning with the hollow axle $z$ is a gear $a$, provided with two or four pins $a'$, working in holes $s$ of gear $e$. To the gear $a$ is attached a spring-latch $h$, entering a notch $h^2$ of axle $z$, so as to prevent any sliding of the gear on the axle during the run, the latch engaging the notch when gear $a$ is engaged with gear $e$ by means of the pins $a'$.

On shaft $y$ are keyed two gears $b$ and $c$, meshing, respectively, with gears $a$ and $d$. Shaft $y$ is supported in bearings $n$ $n'$, which are connected together by means of the connecting-rod $p$, this being fastened to the cone-holder $g$ by means of a screw $h^3$ and nuts $i$ $i'$ and to the driving-gear casing by means of a connection $p'$. Besides this the bearing $n$ is made in one with a bearing $n^2$ on axle $z$, which serves the purpose of preventing any distortion or springing out of line of the bearing $n$ under an eventually greater strain. Shaft $y$ is made to slide in its bearings $n$ and $n'$, so that the gears $b$ $c$ may be engaged with or disengaged from the gears $a$ $d$, respectively. This sliding motion of this shaft is performed by means of a lever $l$, pivoted at $l^2$, connected with the shaft by a fork $l'$, working in a circular notch $y'$ on the end of shaft $y$. The lever $l$ is thrown by a rod $v'$, provided with a knob $v$ and notches $j$ $j'$ $j^2$ and passing through the frame-tube M, in which is fitted a spring $v^2$, pressing the rod against the frame, so as to force a pin $j^3$, fastened to the frame, to enter one of the notches $j$ $j'$ $j^2$, thereby locking the rod in the desired positions.

The operation is as follows: Supposing the mechanism to be in the position shown in Fig. 2, the pin $j^3$ enters the notch $j^2$ in the rod $v'$, and the gears $b$ $c$ are engaged with the gears $a$ $d$, gear $a$ being disengaged from gear $e$. Thereby the transmission of motion from the crank-axle to the driving-wheel is as follows: Bevel-gear $k$, fixed on crank-axle $o$, meshes with bevel-gear $e$, fastened rigidly to gear $d$, which meshes with gear $c$ on shaft $y$. Gear $b$, keyed on this shaft, meshes with gear $a$ on the hollow shaft $z$, to which is fixed the bevel-gear $f$, meshing with bevel-gear R on the driving-wheel hub. This is the normal or slow-motion gearing. If quick-motion gearing is desired, the knob $v$ is pushed down so that pin $j^3$ engages with notch $j$ on rod $v'$. Thereby shaft $y$ is moved axially, disengaging gears $b$ and $c$ from gears $a$ and $d$, respectively, and pushing by means of a disk $r$, attached to the gear $b$, the gear $a$ toward gear $e$, so as to connect both gears by means of pins $a'$ and holes $s$. The power is now transmitted directly by the double gearing $k$ $e$ and $f$ R, and thus quick motion is obtained.

To allow gear $a$ to move axially, spring-latch $h$ is disengaged from the notch $h^2$ by disk $r$ on shaft $y$, which lifts said spring-latch when moving axially with said shaft.

The crank-axle can be completely disengaged from the driving-gear by pushing rod $v'$ in its middle position, pin $j^3$ entering notch $j'$. Then gears $b\,c$ are disengaged from gears $a\,d$, gear $a$ being not connected with gear $e$, whereby the transmission between crank-axle and driving-wheel is completely interrupted. This is advantageously used when riding down a hill.

What I claim as my invention, and desire to secure by Letters Patent, is—

1. The combination with a driving-wheel and means for connecting it with a hollow shaft, of a bevel-gear on the crank-axle, a bevel-gear meshing therewith and keyed on an inner shaft rotating in the hollow shaft and means for connecting together the two shafts, the inner shaft being adapted to rotate at times freely within the hollow shaft and at others to be locked thereto, substantially as described.

2. The combination of a driving-wheel, a hollow shaft connected therewith, a spur-gear feathered thereon, a shaft rotating in said hollow shaft, a spur-gear keyed thereon and a shaft with two gears which engage respectively with said two spur-gears, substantially as described.

3. The combination of a driving-wheel, a hollow shaft connected therewith, a shaft rotating therein, spur-gears on these shafts, a shaft with two gears engaging with said spur-gears, a lever for moving axially this shaft, a rod operating this lever and a pin, entering in notches formed in this rod, for the purpose of locking the rod in the desired positions, substantially as described.

4. The combination of a driving-wheel, a hollow shaft connected therewith, a shaft rotating therein, a gear feathered on the hollow shaft and provided with pins, adapted to enter corresponding holes in a bevel-gear on the second shaft, disks on the axially-movable shaft to throw these gears in or out of engagement and a spring-latch, operated by one of the disks and locking the spur-gear on the hollow shaft, substantially as described.

Signed at Vienna, Austria, this 28th day of December, 1897.

JOHANN RESCH.

Witnesses:
HENRY C. CARPENTER,
ANTON MOSCHEK.